United States Patent
Chou (12)

(10) Patent No.: US 6,186,719 B1
(45) Date of Patent: Feb. 13, 2001

(54) CAPPED LOCK NUT

(76) Inventor: Ming-Chung Chou, P.O. Box 82-144, 1998, Taipei (TW)

( * ) Notice: Under 35 U.S.C. 154(b), the term of this patent shall be extended for 0 days.

(21) Appl. No.: 09/222,839

(22) Filed: Dec. 30, 1998

(51) Int. Cl.⁷ .............................. F16B 37/14; F16B 39/34
(52) U.S. Cl. .......................... 411/429; 411/303; 411/376
(58) Field of Search ................................. 411/303, 376, 411/429, 430, 431

(56) References Cited

U.S. PATENT DOCUMENTS

| | | | |
|---|---|---|---|
| 3,955,231 | * | 5/1976 | Erdmann ........................ 411/429 X |
| 4,993,902 | * | 2/1991 | Hellon ............................ 411/303 X |
| 5,752,793 | * | 5/1998 | Wu ..................................... 411/303 |

FOREIGN PATENT DOCUMENTS

195009 * 8/1990 (JP) ..................................... 411/376

* cited by examiner

*Primary Examiner*—Neill Wilson
(74) *Attorney, Agent, or Firm*—A & J

(57) ABSTRACT

An improvement in the structure of a capped lock nut includes a nut body made of metal and formed with a shoulder extending upwardly from a top of the nut body and then inwardly to form a flange thereby providing an annular recess between the flange and an upper thread of internal threads of the nut body; a nylon packing ring snugly-fitted within the nut body; and a cap being a hemispherical shell member having an outer diameter which is just equal to an outer diameter of the shoulder of the nut body, whereby the cap can be easily welded to the nut body without causing damage to the nylon packing ring thus strengthening the engagement therebetween and increasing the production rate.

2 Claims, 2 Drawing Sheets

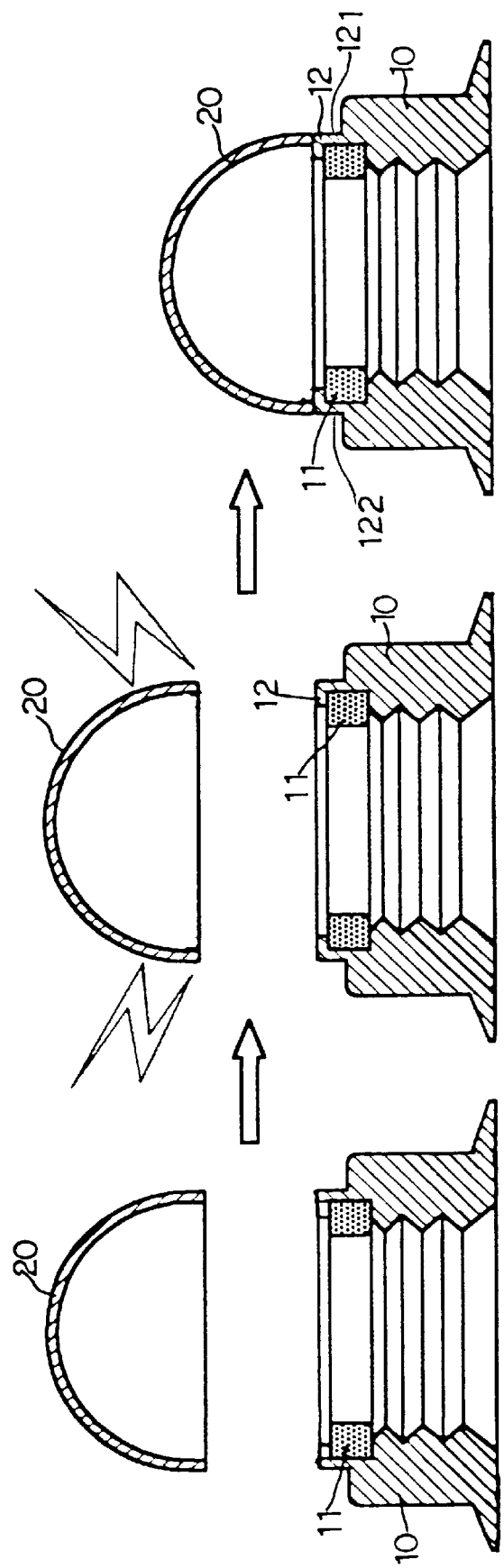

CAPPED LOCK NUT

BACKGROUND OF THE INVENTION

1. Field of the Invention

This invention is related to an improvement in the structure of a capped lock nut and in particular to one which can be easily manufactured.

2. Description of the Prior Art

The conventional capped lock nut generally includes a nut body formed with an upwardly extending flange on which is welded a cap for preventing dust or like to enter into the nut body. However, such a capped lock nut is easily loosened when subject to vibration. Hence, a nylon packing has been proposed to be secured on the top of the nut body in such a way that the upper portion of the nylon packing extends upwardly out of the nut body and a cap is riveted or otherwise secured to the top of the nut body. Nevertheless, the cap will be easily separated from the nut body when the lock nut is engaged with a long screw thereby producing sharp edges and therefore often causing injuries to the operator. Hence, it must be very careful to engage such a capped lock nut with a long screw thus making it difficult to use and increasing the cost. The reason why the cap is riveted but not welded to the nut body is that the nylon packing will be deformed or even melted if the cap is welded to the nut body. In addition, it is time-consuming to fasten the cap on the nut body by rivets thereby lowering the production rate and therefore increasing the cost.

Therefore, it is an object of the present invention to provide an improvement in the structure of a capped lock nut which can obviate and mitigate the above-mentioned drawbacks.

SUMMARY OF THE INVENTION

This invention is related to an improvement in the structure of a capped lock nut.

It is the primary object of the present invention to provide an improved capped lock nut having which can be easily manufactured.

It is another object of the present invention to provide an improved capped lock nut wherein the cap can be firmly welded on the nut body.

It is still another object of the present invention to provide an improved capped lock nut which is manufactured by electric welding thereby producing no noise pollution.

It is still another object of the present invention to provide an improved capped lock nut which is low in cost.

It is a further object of the present invention to provide an improved capped lock nut which is fit for mass production.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 1A, 1B and 1C illustrate how a cap is engaged with a nut body according to the present invention;

DETAILED DESCRIPTION OF THE PREFERRED EMBODIMENT

Figure 4:
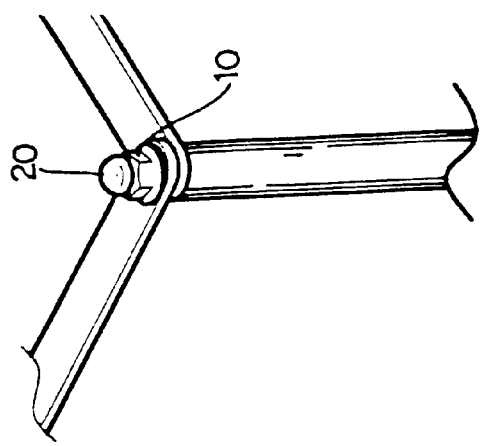
FIG. 4 is a working view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
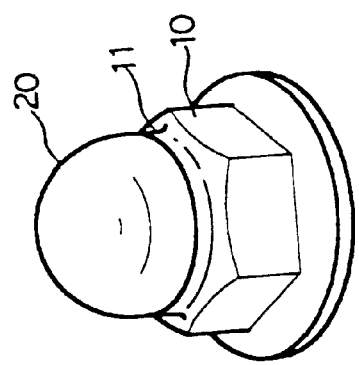
FIG. 3 is a perspective view of the present invention.
Figure 2:
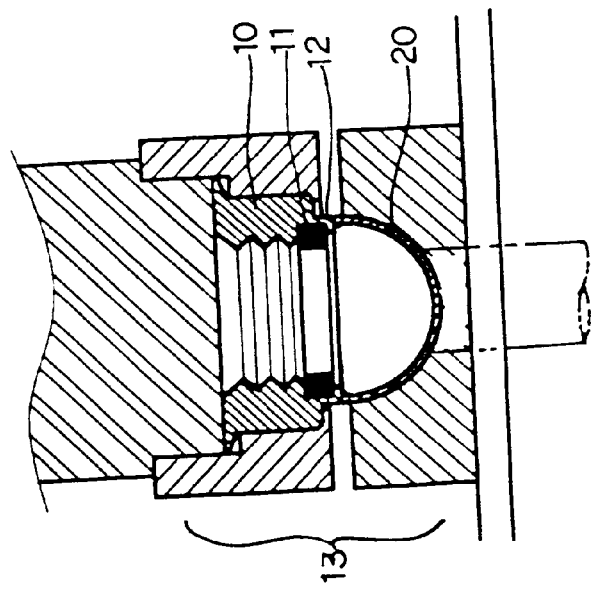
FIG. 2 illustrates how to secure the cap to the nut body with a set of molds.

With reference to the drawings and in particular to FIGS. 1A, 1B, 1C, 2 and 3 thereof, the capped lock nut according to the present invention generally comprises a nut body 10, a nylon packing ring 11 and a metal cap 12.

The nut body 10 is made of metal and formed with a shoulder 122 which extends upwardly from the top of the nut body 10 and then inwardly to form a flange 12 thereby providing an annular recess 121 between the flange 12 and the upper thread of the internal threads of the nut body 10 for receiving the nylon packing ring 11. The cap 20 is a hemispherical shell member having an outer diameter and a thickness which are respectively equal to the outer diameter and thickness of the shoulder 122 of the nut body 10. The cap 20 may be a curved enclosure as required. The engagement between the nut body 10 and the cap 20 will now be described as follows:

a. preparing a set of molds 13;
b. arranging the cap 20 and the nut body 10 in the lower mold and upper mold respectively; with the edge of the cap 20 even with the outer circumferential surface of the nut body 10;
c. connecting the upper and lower molds with positive and negative electrodes of a power source (not shown); and
d. turning on the power source to weld the cap 20 on the nut body 10.

As the nylon packing ring 11 is fitted within the annular recess 121 between the flange 12 and the upper thread of the internal threads of the nut body 10, it will be protected from the higher temperature produced at the time of welding and no damage will be made to the nylon packing ring 11 when the cap 20 is welded to the nut body 20. Furthermore, the power source has a voltage of 400–480 volts for the welding and it needs less than 0.1 second to weld a metal sheet with 0.6 mm in thickness, so that the cap 20 can be momentarily welded on the nut body 20 thereby preventing the nylon packing ring 11 from being damaged by the high temperature produced at the time of welding. In addition, the cap 20 has the same thickness of the shoulder 122 of the nut body 10, the cap 20 can be evenly welded to the nut body 10. The molds 13 are provided with a water cooling system (not shown) for rapidly dissipating the heat generated at the time of welding so as to protect the nylon packing ring 13 from being damaged. As the cap 20 is evenly welded to the nut body 10, the cap 20 is firmly fastened on the nut body so that even if the present invention is engaged with a long screw (not shown) by mistake, the cap 20 will not be disengaged from the nut body 10 thus preventing the present invention from loosening from a screw.

Accordingly, the present invention has the following advantages over the prior art:

1. Easy to Manufacture

The cap and the nut body are positioned by a set of molds and then momentarily welded together by electric power thereby enabling the capped lock nut to be manufactured by automatic production line and making it fit for mass production.

2. Quiet and Safe

The whole production process is controlled by electric power and so there will be no noise generated by pressing and riveting in manufacture. The time required for the passing of electric current through the cap and the nut body can be easily controlled to obtain the optimum engagement therebetween hence ensuring the safety in use.

3. Low in Cost and High in Production

The capped lock nut can be continuously manufactured by automatic production line and no manual power is required for the manufacture thereby lowering the skill requried for the operator and decreasing the cost.

4. Good Looking

As the cap 20 is even with the shoulder 122 at the connection therebetween, the capped lock nut according to the present invention will not have burs at the outer surface thereby eliminating the finishing procedures.

Problem in the Prior Art

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

In the claim:

1. A capped lock nut comprising:

a nut body made of metal and formed with a shoulder extending upwardly from a top of said nut body and then inwardly to form a flange thereby providing an annular recess between said flange and an upper thread of internal threads of said nut body;

a nylon packing ring snugly-fitted within said nut body; and a cap being a hemispherical shell member having same thickness as said shoulder and having an outer diameter which is just equal to an outer diameter of said shoulder, said cap being welded on said nut body as follows: preparing a lower mold and an upper mold; arranging said cap and said nut body in said lower mold and said upper mold respectively, with an edge of said cap even with an outer circumferential surface of said nut body; connecting said upper and lower molds with positive and negative electrodes of a power source with a voltage of 400–480 volts; and turning on said power source to weld said cap on said nut body.

2. The capped lock nut as claimed in claim 1, wherein said cap has a shape of a curved enclosure.

* * * * *